United States Patent
Li et al.

(10) Patent No.: US 8,812,270 B2
(45) Date of Patent: Aug. 19, 2014

(54) COOLING CIRCUIT DESIGN

(75) Inventors: Zhi Li, Cypress, CA (US); Jingmei Wang, Pudong (CN)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 365 days.

(21) Appl. No.: 13/223,451

(22) Filed: Sep. 1, 2011

(65) Prior Publication Data

US 2013/0060529 A1    Mar. 7, 2013

(51) Int. Cl.
    *G06F 17/50* (2006.01)
    *B29C 33/38* (2006.01)
    *B29C 33/04* (2006.01)

(52) U.S. Cl.
    CPC ........ *G06F 17/5086* (2013.01); *B29C 33/3835* (2013.01); *B29C 33/04* (2013.01); *Y10S 715/964* (2013.01)
    USPC .............................. 703/1; 715/964; 345/420

(58) Field of Classification Search
    CPC ............ G06F 17/5086; G06F 17/5095; G06F 2217/34; B29C 33/3835; B29C 33/04; G06T 19/00
    USPC .............................. 703/1; 715/964; 345/420
    See application file for complete search history.

(56) References Cited

U.S. PATENT DOCUMENTS

2004/0064211 A1 *    4/2004    Mateau et al. ................... 700/97

FOREIGN PATENT DOCUMENTS

EP    0 443 437            8/1991
EP       443437 A2 *       8/1991

OTHER PUBLICATIONS

Li, C.L. et al., "Automatic Layout Design of Plastic Injection Mould Cooling System", 2005, Computer Aided Design 37, Elsevier Ltd.*
Villalon, Ada V., "Electron Beam Fabrication of Injection Mold Tooling with Conformal Cooling Channels", 2005, Master of Science Thesis, Industrial Engineering, North Carolina State University.*
Wang, Yu et al., "Automatic Design of Conformal Cooling Circuits for Rapid Tooling", Apr. 11, 2011, Computer-Aided Design, Elsevier Ltd.*
PCT International Search Report mailed Dec. 10, 2012 in connection with PCT International Application No. PCT/US2012/053332 filed Aug. 31, 2012 (4 pages).
Written Opinion of the International Searching Authority dated Dec. 10, 2012 in connection with International Application No. PCT/US2012/053332 (6pages).
Li C L et al "Automatic Layout Design of Plastic Injection Mould Cooling System" Computer Aided Design, Elsevier Publishers BV. Barking GB vol. 37 No. 7 Jun. 1, 2005, pp. 645-662.

* cited by examiner

*Primary Examiner* — Dwin M Craig
*Assistant Examiner* — Cedric D Johnson

(57) ABSTRACT

Methods for computer-aided design and corresponding systems and computer-readable mediums. A method includes receiving a CAD model including a plurality of intersecting fluid channels, and determining a fluid inlet for the fluid channels. The method includes displaying possible fluid flow directions at an intersection of fluid channels. The method includes automatically adding a cooling fitting to at least one of the fluid channels of the CAD model in response to a user selection of one of the possible fluid flow directions.

21 Claims, 6 Drawing Sheets

COOLING CIRCUIT DESIGN

TECHNICAL FIELD

The present disclosure is directed, in general, to computer-aided design, visualization, and manufacturing systems, product lifecycle management ("PLM") systems, and product data management ("PDM") systems that manage data for products and other items (individually and collectively, computer aided design or "CAD" systems).

BACKGROUND OF THE DISCLOSURE

CAD systems are useful for designing products. Improved systems are desirable.

SUMMARY OF THE DISCLOSURE

Various disclosed embodiments include CAD methods and corresponding systems and computer-readable mediums. A method includes receiving a CAD model including a plurality of intersecting fluid channels, and determining a fluid inlet for the fluid channels. The method includes displaying possible fluid flow directions at an intersection of fluid channels. The method includes automatically adding a cooling fitting to at least one of the fluid channels of the CAD model in response to a user selection of one of the possible fluid flow directions.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

A cooling system plays an important role in the injection mold process. Proper cooling systems will save injection process time, improve product quality to avoid residual stress and product defects, such as shrinkage and warp. An efficient cooling circuit design tool can not only save design time, but also can reduce cooling time and improve part quality and productivity.

Cooling design is a complicated process, since the cooling system is dependent on product shape and many steps are involved to design the cooling channel, circuit, and fittings. In current mold design, cooling design is a time consuming process since users have to design cooling circuit step by step manually. When there are hundreds of cooling channels, it's very hard to manage and validate coolant flow in these channels. Design errors are easily introduced in a manual design process and it can be very expensive to find and fix design issues in production.

Disclosed embodiments enable users to finish complicated cooling design quickly and easily, and can validate and manage the cooling design results.

Disclosed embodiments include systems and methods that can interact with a user to manage cooling circuits, to validate the coolant flow in cooling channel, and to ensure proper fittings such as plugs, connectors, and diverters are automatically added with the right size and orientation to direct the cooling flow as required. Multiple channels in one product design can separate into several cooling circuits. The cooling circuit can indicate where coolant in received into the channel (inlet), where coolant is released from the channel (outlet), and the plugs/diverters that control coolant flow direction. The circuit center lines can be managed, and these flow lines can be used to do cooling analysis and to calculate coolant pressure to balance cooling in different circuits.

Figure 1:
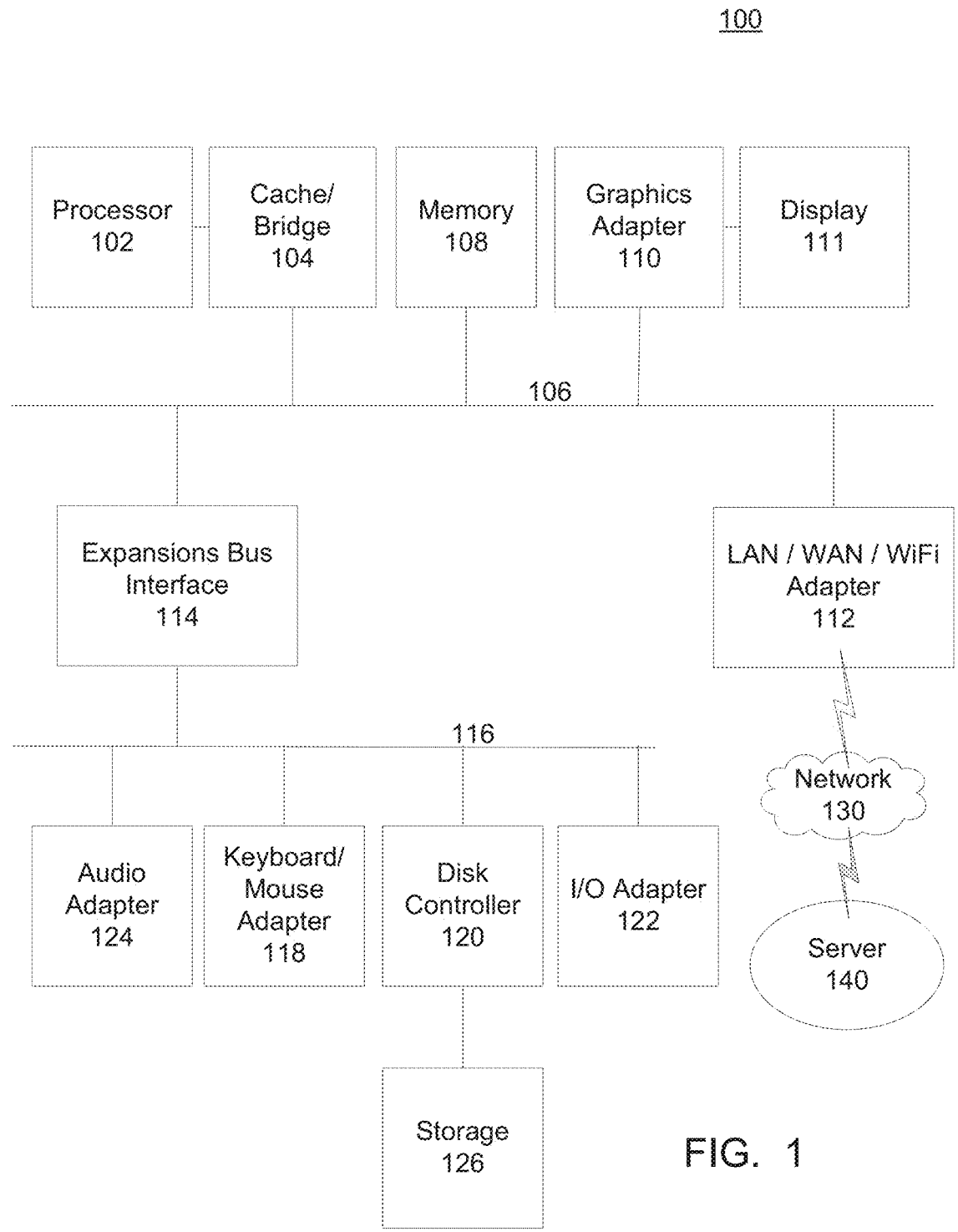
FIG. 1 depicts a block diagram of a data processing system in which an embodiment can be implemented.

FIG. 1 depicts a block diagram of a data processing system in which an embodiment can be implemented, for example as a CAD system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Figure 2:
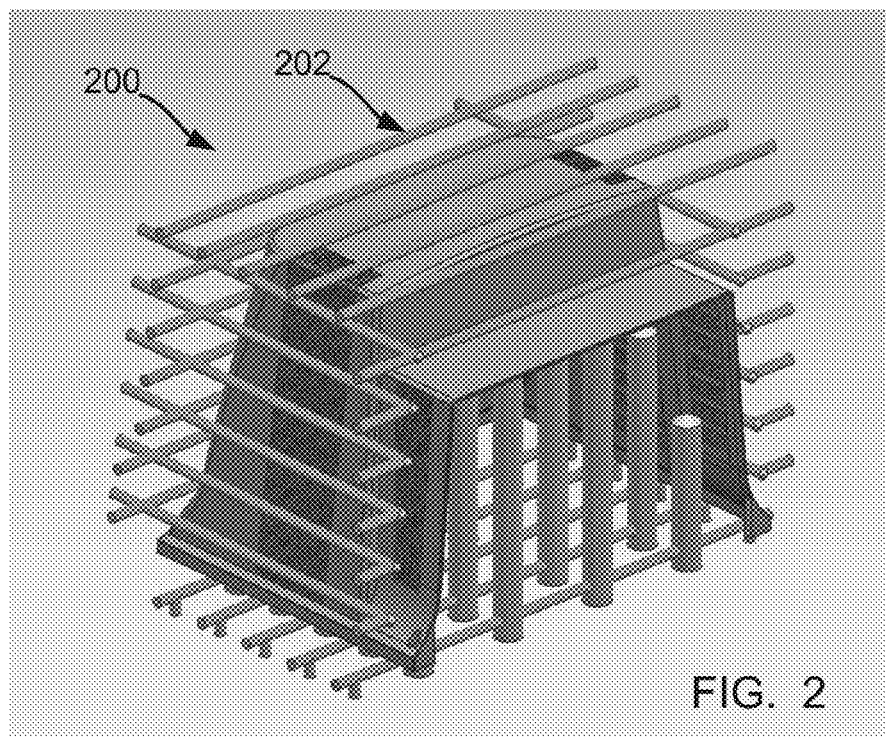
FIG. 2 depicts an example of a model with a network of cooling channels.

FIG. 2 depicts an example of a model 200 with a network of cooling channels 202. Cooling channels 202 can be designed for a product in mold design, for example. Simply showing these channels in a model are not enough to determine how coolant flows in the channel, where coolant comes in, where coolant goes out, and how to control coolant flow.

Figure 3:
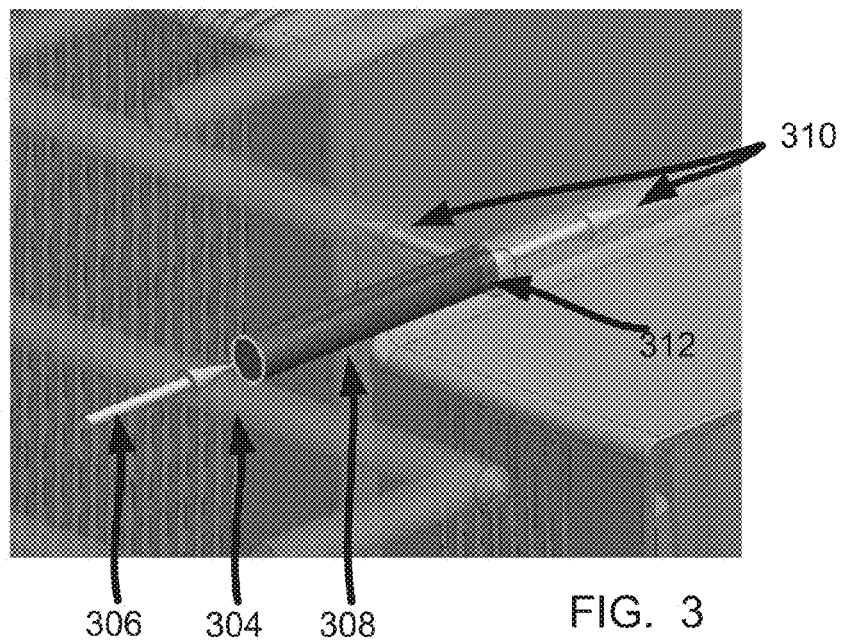
FIG. 3 shows an example of a model portion in accordance with disclosed embodiments.

FIG. 3 shows an example of a model portion in accordance with disclosed embodiments corresponding to a portion of the model 200. Disclosed embodiments can receive a user selection of an inlet point 304. The system creates and displays an inlet mark 306 and a solid 308 that shows the coolant flow. Though not depicted in this illustration, the solid 308 is preferably displayed in a different color for easy user identification. The system also determines the coolant flow based on the selected inlet point 304, and displays direction "handles" 310 at channel intersections 312 to illustrate the possible coolant flow directions.

In various embodiments, the system can receive a user selection of a handle to determine coolant flow direction, and the system in response adds plugs or diverters this cooling circuit automatically and with the correct dimension. The system can display circuit center lines and fitting position and size.

According to disclosed embodiments, the system can identify all intersection points of the selected channel with other channels. The cooling, channel's intersection points can be discriminated and each point's parameter can be recorded. The intersection points can then be compared with a user-defined direction to get the next valid flow path. The center line of the valid flow path will be created as circuit.

A cooling channel end that is not recognized as outlet can be identified as a cooling fitting location, and can display a cooling fitting symbol at this location. The cooling fitting symbols can have associated dimensions and positions. The system can receive a user adjustment of the dimension and position information manually if the automatic result is not satisfactory to the user.

In various embodiments, the system thereby produces and stores a valid coolant flow line in the model.

Figure 4:
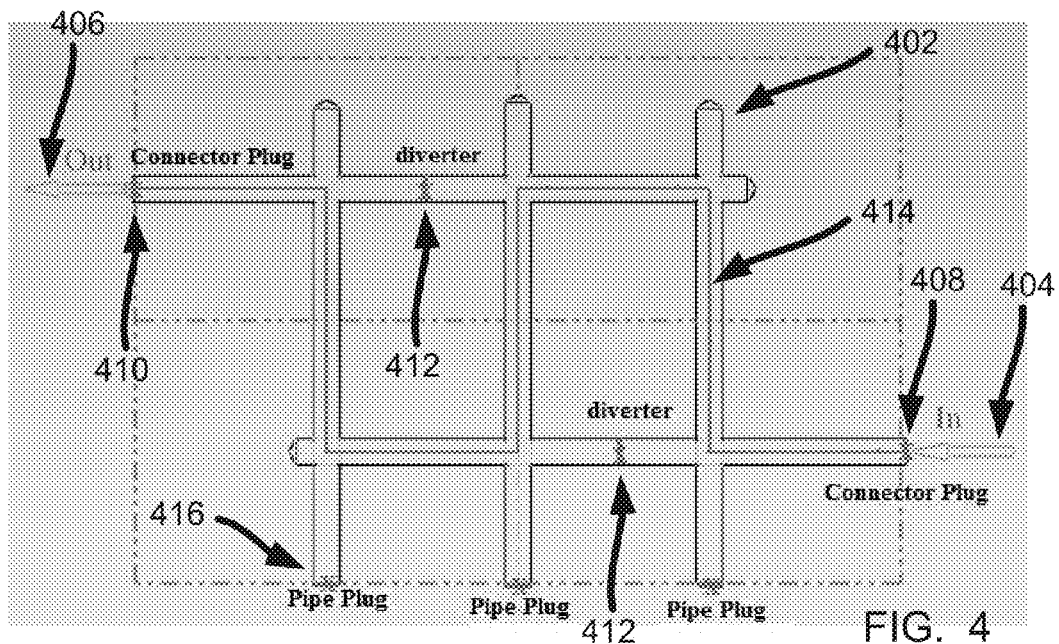
FIG. 4 shows a coolant flow line in a two-dimensional (2D) model produced by a process in accordance with disclosed embodiments.

FIG. 4 shows a coolant flow line in a two-dimensional (2D) model produced by a process in accordance with disclosed embodiments. FIG. 4 represents atypical simple flat cooling circuit design. In this figure, the system displays a network of pipes 402. This system also displays an inlet mark 404, indicating where the cooling fluid enters the pipes 402. The system can also display an outlet mark 406, indicating where the cooling fluid exits the pipes 402. The system can display a connector plug 408 at the inlet mark 404. The system can also display connector plugs 410 at appropriate locations where the flow is plugged, as well as diverters 412 to show where the flow can be selectively diverted. The system determines and displays the valid coolant flow path 414.

One advantage of disclosed embodiments is the ability to automatically create and place cooling fittings in the cooling circuit design. During cooling circuit design, the type, location, orientation, and size of fittings are designed.

Various embodiments can include six fitting types in the circuit design: inlet connectors, outlet connectors, plugs, diverters, O-rings, and baffles. Each fitting type can have a corresponding pre-defined parameter symbol and 3D solid model part.

The system can determine the appropriate fitting type according to the cooling flow circuit. An inlet connector can be added in the start position, illustrated as inlet mark 408 in FIG. 4. An outlet connector can be added at the end of the circuit, illustrated as outlet mark 410 in FIG. 4.

If a fitting point is at the end of a cooling channel, a plug type can be used, illustrated as pipe plug 416 in FIG. 4. If more than two intersection points are found for a selected channel, a diverter fitting point can be created, illustrated as diverters 412 in FIG. 4. When cooling channel goes through a workpiece, an O-ring can be added. If a baffle channel is selected, baffle fitting can be added.

Figure 5:
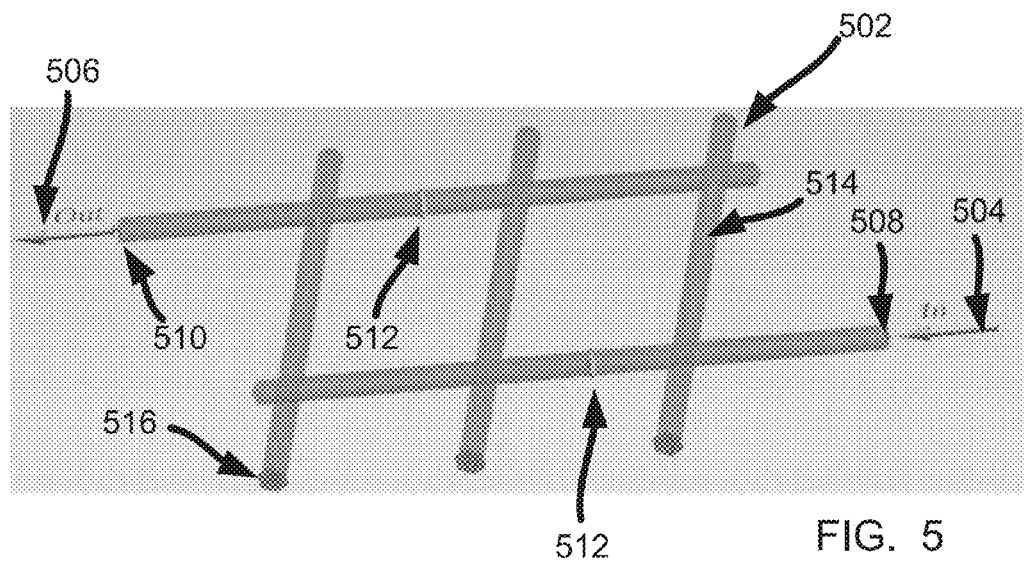
FIG. 5 shows a coolant flow line in a three-dimensional (3D) model produced by a process in accordance with disclosed embodiments.

FIG. 5 shows a coolant flow line in a three-dimensional (3D) model produced by a process in accordance with disclosed embodiments, and corresponding to the model of FIG. 4. FIG. 5 represents typical simple flat cooling circuit design. In this figure, the system displays a network of pipes 502. This system also displays inlet mark 504, indicating where the cooling fluid enters the pipes 502. The system can also display an outlet mark 506, indicating where the cooling fluid exits the pipes 502. The system can display a connector plug 508 at the inlet mark 504 and a connector plug 510 at the outlet mark 506, or at other locations. The system can also display pipe plugs 516 at appropriate locations where the flow is plugged, as well as diverters 512 to show where the flow can be selectively diverted. The system determines and displays the valid coolant flow path 514.

Figure 6:
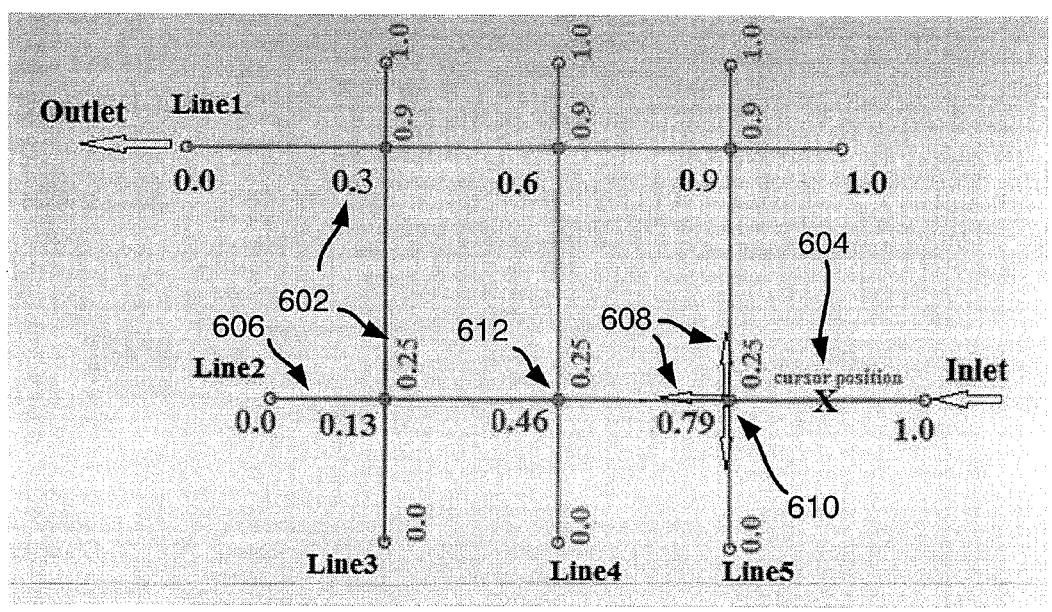
FIG. 6 is a system model that illustrates a process in accordance with disclosed embodiments.

FIG. 6 is a system model that illustrates a process in accordance with disclosed embodiments, and generally corresponds to the exemplary models of FIGS. 4 and 5.

Fitting positions can be determined automatically by the system when designing the cooling channel. When a flow direction is selected by a user, all other flow directions can be automatically blocked by fittings. In the example of FIG. 6, there are three potential flow directions at intersection 610, where the inlet is at the right end of Line 2 606. When the "up" direction is selected in this example, other two flow directions, left and down, must be blocked by fittings. In the left direction from intersection 610, there is another cooling channel intersection point 612; the system can use the midpoint between 610 and 612 to add a diverter fitting.

Figure 7:
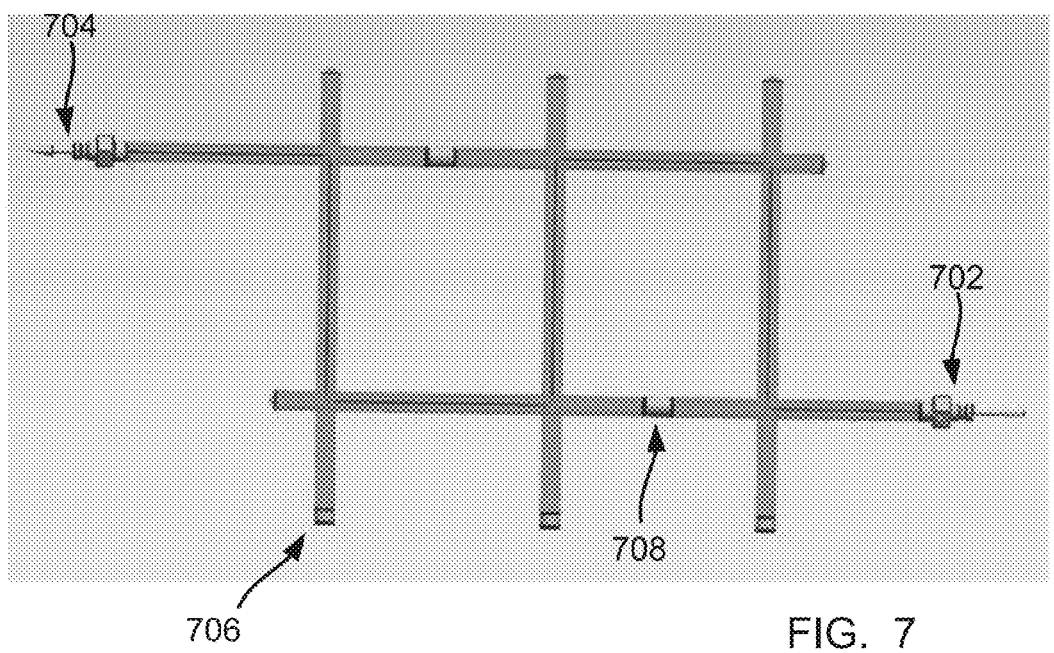
FIG. 7 illustrates fitting placement in accordance with disclosed embodiments.

FIG. 7 illustrates fitting placement in accordance with disclosed embodiments, and generally corresponds to the exemplary models of FIGS. 4-6. This figure illustrates one way in which fitting standard parts can be added with cooling circuit information.

Fitting orientations can be decided by the fitting point and flow direction. For example, at the inlet 702 and outlet 704, the connector orientation will follow the flow direction. The plug direction is always against the channel end face normal, as illustrated by plug 706. Diverters and O-rings have no orientation requirements, as illustrated by diverter 708.

Fitting sizes can be determined by the cooling channel size. The fitting channel size is queried, and the returned channel size and type information can be used to search a fitting database. The corresponding size information is returned and can be attached to the fitting symbol or added to a 3D solid fitting model.

Fittings can be added as symbols or 3D solid models. Symbols are particularly useful for large cooling channel designs where there can be hundreds or thousands of fittings. Symbol-based design is light, fast, and very good for conceptual design. When fitting symbols are added to a cooling circuit, all size information can be attached as attributes. These fitting symbols can be converted to 3D solid fittings automatically. Embodiments and processes described herein apply to both fitting symbols and 3D solid fittings.

Figure 8:
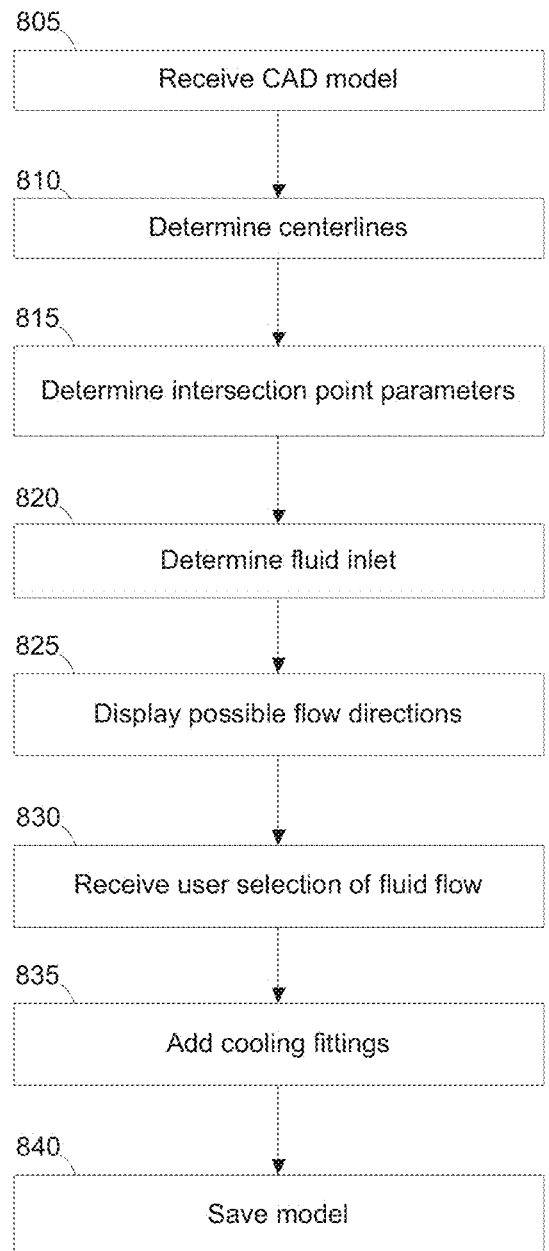
FIG. 8 depicts a flowchart of a process in accordance with disclosed embodiments.

FIG. 8 depicts a flowchart of a process in accordance with disclosed embodiments, which may be performed, for example, by one or more CAD systems. This process is described using FIG. 6 as an example.

The system receives a CAD model including a plurality of intersecting fluid channels (step 805). Each of the fluid channels has a centerline. "Receiving", as used herein, can include loading from storage, receiving from another device or process, receiving via an interaction with a user, or otherwise. The CAD model can be 2D, 3D, a line model, a mathematical model, or otherwise.

The system determines the centerlines for each of the fluid channels (step 810). The centerlines of the fluid channels are shown as Lines 1-5 in FIG. 6.

The system determines an intersection point parameter for each of the intersections of the fluid channels (step 815). These intersection point parameters 602 are shown in FIG. 6. Each intersection point can have two different parameters as a result of being calculated on two different lines.

The system determines a fluid inlet for the fluid channels (step 820). As part of this step, the system can receive a user selection of a channel on the model, at a location specified by a cursor point parameter at a cursor location. The cursor location 604 is shown in FIG. 6. The selected channel in this example is Line 2 606. This step can include determining the nearest endpoint of the centerline on the selected cooling channel, and if a blind hole is not encountered, determining that endpoint is the fluid inlet. If a blind hole encountered, the non-blind end is determined to be the fluid inlet.

At each intersection, the system displays possible fluid flow directions (step 825). This can be based on the determined fluid inlet or any other cooling fittings, and so the direction from which fluid flows into that intersection need not be shown. These can be displayed using, for example, arrows 608.

At each intersection, the system receives a user selection of fluid flow direction (step 830). This can be, for example, a user selecting a displayed arrow.

In response to the user selection, the system adds cooling fittings to the model on each of the intersecting lines at that intersection to direct flow as selected (step 835). For example, in each non-selected direction, the system can add a cooling fitting to mark that coolant will not flow in this path. If the fitting position is between two channel intersections, a diverter can be used as a default type. If the fitting position is at the end of a channel, a pipe plug can be used as a default type. A blind hole end point does not require any type of cooling fittings.

Steps 825-835 can be repeated for each intersection through which fluid flows, until the entire fluid path is defined by appropriate cooling fittings.

After adding one or more fittings, the system can save or display the model (step 840).

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should he read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method performed by a CAD data processing system, the method comprising:
   receiving a CAD model including a plurality of intersecting fluid channels;
   determining a fluid inlet for the fluid channels;
   displaying possible fluid flow directions at an intersection of fluid channels; and
   in response to a user selection of one of the possible fluid flow directions, the user selection received via a user interaction using a pointing device in a graphical user interface, automatically adding a cooling fitting to at least one of the fluid channels of the CAD model.

2. The method of claim 1, wherein determining a fluid inlet for the fluid channels includes receiving a user selection of a channel and determining that an endpoint of the selected channel is the fluid inlet.

3. The method of claim 1, wherein the possible fluid flow directions are determined based on the fluid inlet.

4. The method of claim 1, wherein the possible fluid flow directions are determined based on a cooling fitting in the model.

5. The method of claim 1, wherein the cooling fitting is added between two intersections of fluid channels and is a diverter.

6. The method of claim 1, wherein the cooling fitting is added at the end of a fluid channel and is a pipe plug.

7. The method of claim 1, wherein the cooling fitting is added to at least one of the fluid channels that does not correspond to the possible flow direction selected by the user.

8. The method of claim 1, further comprising:
   determining one or more intersection point parameters for each of the intersections of the fluid channels; and
   displaying the one or more intersection point parameters at the intersections,
   wherein each intersection point parameter of an intersection is related to a different line.

9. A CAD data processing system comprising:
   a processor; and
   an accessible memory, the data processing system particularly configured to receive a CAD model including a plurality of intersecting fluid channels;
   determine a fluid inlet for the fluid channels;
   display possible fluid flow directions at an intersection of fluid channels; and
   automatically add a cooling fitting to at least one of the fluid channels of the CAD model in response to a user selection of one of the possible fluid flow directions, wherein the user selection is received via a user interaction using a pointing device in a graphical user interface.

10. The data processing system of claim 9, wherein determining a fluid inlet for the fluid channels includes receiving a user selection of a channel and determining that an endpoint of the selected channel is the fluid inlet.

11. The data processing system of claim 9, wherein the possible fluid flow directions are determined based on the fluid inlet.

12. The data processing system of claim 9, wherein the possible fluid flow directions are determined based on a cooling fitting in the model.

13. The data processing system of claim 9, wherein the cooling fitting is added between two intersections of fluid channels and is a diverter.

14. The data processing system of claim 9, wherein the cooling fitting is added at the end of a fluid channel and is a pipe plug.

15. The data processing system of claim 9, wherein the cooling fitting is added to at least one of the fluid channels that does not correspond to the possible flow direction selected by the user.

16. A non-transitory computer-readable medium encoded with executable instructions that, when executed, cause one or more CAD data processing systems to:
   receive a CAD model including a plurality of intersecting fluid channels;
   determine a fluid inlet for the fluid channels;
   display possible fluid flow directions at an intersection of fluid channels; and
   automatically add a cooling fitting to at least one of the fluid channels of the CAD model in response to a user selection of one of the possible fluid flow directions, wherein the user selection is received via a user interaction using a pointing device in a graphical user interface.

17. The computer-readable medium of claim 16, wherein determining a fluid inlet for the fluid channels includes receiving a user selection of a channel and determining that an endpoint of the selected channel is the fluid inlet.

18. The computer-readable medium of claim 16, wherein the possible fluid flow directions are determined based on the fluid inlet.

19. The computer-readable medium of claim 16, wherein the possible fluid flow directions are determined based on a cooling fitting in the model.

20. The computer-readable medium of claim 16, wherein the cooling fitting is added between two intersections of fluid channels and is a diverter.

21. The computer-readable medium of claim 16, wherein the cooling fitting is added to at least one of the fluid channels that does not correspond to the possible flow direction selected by the user.

* * * * *